Dec. 8, 1925.
H. C. EBRIGHT
1,565,068
DRESSER FOR GALVANIZING KETTLES
Filed April 3, 1924  2 Sheets-Sheet 1
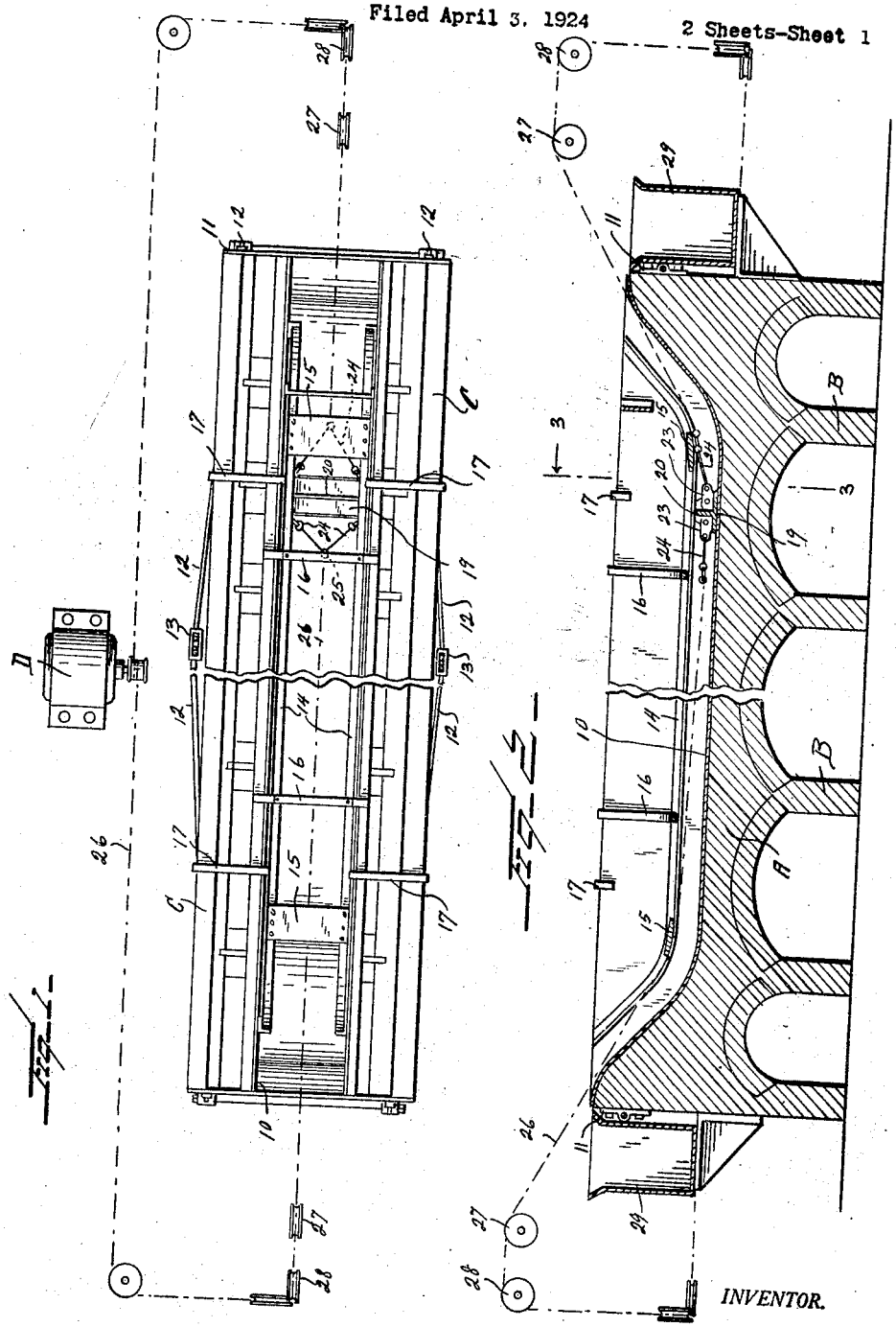
INVENTOR.
H. C. Ebright
BY Watson E. Coleman
ATTORNEY.

Dec. 8, 1925.
H. C. EBRIGHT
1,565,068
DROSSER FOR GALVANIZING KETTLES
Filed April 3, 1924   2 Sheets-Sheet 2
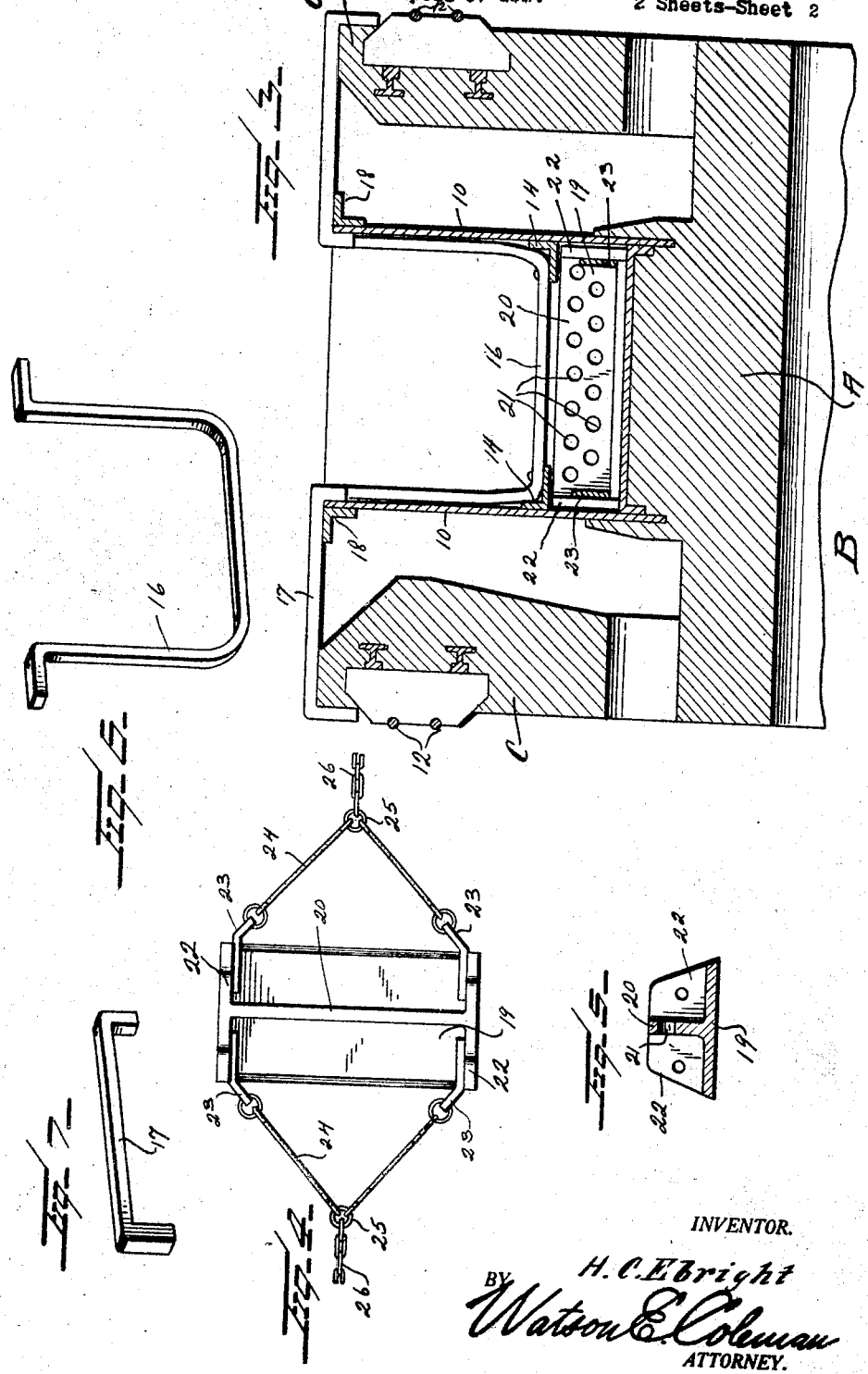
INVENTOR.
H. C. Ebright
BY Watson E. Coleman
ATTORNEY.

Patented Dec. 8, 1925.

1,565,068

UNITED STATES PATENT OFFICE.

HARRY CLYDE EBRIGHT, OF YOUNGSTOWN, OHIO.

DROSSER FOR GALVANIZING KETTLES.

Application filed April 3, 1924. Serial No. 704,029.

*To all whom it may concern:*

Be it known that I, HARRY CLYDE EBRIGHT, a citizen of the United States, residing at Youngstown, in the county of Mahoning and State of Ohio, have invented certain new and useful Improvements in Drossers for Galvanizing Kettles, of which the following is a specification, reference being had to the accompanying drawings.

This invention relates to galvanizing kettles, and particularly to means for cleaning the same, or in other words removing the dross therefrom.

Ordinarily galvanizing kettles have the dross removed therefrom by means of a long-handled shovel which is operated by hand and it takes the full crew of the kettle about ten hours to clean the kettle. This drossing occupies about one day each week and costs from $200 to $250 per month per pipe kettle and about $50 to $75 per month per sheet kettle.

The general object of the present invention is to eliminate this hand work in removing dross from the galvanizing kettles and eliminate the delays due to this cleaning process by the provision of a cleaning device which is adapted to be used every day within the kettle to clean the dross therefrom and which is operated by power.

A further object is to provide a device of this character which includes a scraper or shovel drawn by a motor operated chain, the scraper being pulled back and forth over the bottom of the kettle until it has cleaned the same.

A still further object is to provide means for holding the scraper down in place within the bottom of the kettle, this means preferably consisting of oppositely disposed scraper guides extending longitudinally of the kettle and beneath which the ends of the scraper or shovel operate.

Another object is to provide a scraper or shovel of this character which may be operated by a continuous chain drive with a motor at each end of the kettle or which may be driven from one end only, the motor being operated reversely to pull the scraper in both directions.

Other objects will appear in the course of the following description.

My invention is illustrated in the accompanying drawings, wherein:—

Figure 1 is a top plan view of a pipe galvanizing kettle with my improved drosser applied thereto;

Figure 2 is a longitudinal vertical sectional view through the construction shown in Figure 1;

Figure 3 is a transverse sectional view on the line 3—3 of Figure 2;

Figure 4 is a top plan view of the scraper and the draft connections applied thereto;

Figure 5 is a section through the scraper transverse to the length thereof;

Figure 6 is a perspective view of one of the yokes;

Figure 7 is a perspective view of one of the braces 17 connecting the kettle to the side walls of the furnace.

In the drawings, it will be seen that I have illustrated a conventional form of pipe galvanizing kettle in which there is a masonry base or furnace, designated A, supported by arches B within which the products of combustion from the furnace may pass by which the kettle itself is heated. This masonry base A may have any desired width according to the width of the kettle and is formed to provide a relatively narrow but relatively long depression adapted to fit the kettle proper, which is designated 10. This kettle proper is upwardly extended at each end at an inclination which depends upon the length of the kettle. It is to be understood that the ordinary galvanizing kettle does not have the upwardly inclined ends and that the upward inclination of these ends is given to the kettle illustrated in my drawings for the purpose of removing the cleaning scrapers or cleaners, as will be more fully hereinafter stated. The masonry base is strengthened by transverse plates 11 at each end, through which the longitudinally extending tie bars 12 pass, certain of these bars having turn-buckles 13 whereby the length of the bars may be adjusted.

Extending parallel to the bottom of the kettle are the angle iron guides 14 which are riveted to yokes 16. These guides are disposed inward above the bottom of the kettle a uniform distance throughout their entire length. These guides are upwardly curved at their ends parallel to the upward curvature of the ends of the kettle, and at the places where the curved or upwardly inclined portions of the guides join the horizontally arranged portions of the guides there is disposed an extra plate 15 which extends transversely of the kettle, as illustrated in Figure 3, and is riveted to these angle iron guides. This plate is designed to compensate for and take up the wear incident to the change of motion of the scraper as it passes from the straight bottom of the kettle onto the inclined ends of the same.

The yokes 16 are U-shaped in form and are angularly bent at their upper ends to engage over the side walls of the kettle, the lower ends of the yoke being spaced from the bottom of the kettle. The yokes are designed to support the pipe within the pipe galvanizing kettle shown. The side walls C, which extend upward from the base, are spaced from the side walls of the kettle but the side walls of the kettle at their upper ends are engaged with these side walls C by means of transversely extending braces 17 which at their inner ends are bent over to engage the side walls and an angle iron 18 which extends along the same and with their outer ends bent down outside of the walls C.

Disposed between the bottom of the kettle and the guides 14 and operating in this space is a scraper, designated generally 19. While I do not wish to be limited to any particular form of scraper, it is preferably T-shaped in cross section so as to form a flat lower portion resting upon the bottom 10 of the kettle and a tranverse cross bar 20, this cross bar being perforated at a plurality of points, as at 21. The ends of the cross bar 20 are connected to the flat horizontal portion by integral wings 22 and inward of these wings are provided longitudinally extending ears 23 with which convergent cables 24 are adapted to engage, these convergent cables being in turn connected to rings 25 to which relatively long chain cables 26 are connected. These chain cables extend the full length of the kettle 10 and beyond the same and operate over sheaves 27 and 28 at each end. These cables may be connected to any suitable motor operated winding drum located at each end of the cable or may extend over suitable sheaves to the motor D and then to the other end of the cable and there back to the scraper. By operating this cable 26 in one direction or the other, it is obvious that the scraper will be pulled first in one direction and then in the other over the bottom of the kettle and that the dross accumulated in the kettle will be carried by the scraper up the inclined ends of the kettle and into suitable containers 29 disposed at the ends of the kettle to receive the dross.

A construction of this character entirely does away with the drossing of the galvanizing kettles by hand. As hereinbefore described, the scraper is held down on the bottom of the kettle by the guides, it being remarked that dross always accumulates on the very bottom of the kettle, and these guides and the racks which hold the pipe or other material to be galvanized are all fastened together and set down into the kettle and held securely by being attached to the top of the kettle. The scraper is to be drawn through the kettle at regular intervals during working hours, which will always keep the kettle clean, thereby avoiding the troubles that are now experienced by having dirty kettles.

These scrapers are made of any size according to the size of the kettle, and it will be obvious that the scraper and its allied mechanism may also be changed in many ways to accommodate it to any specific form of kettle or to the work intended to be performed therein. One of the particular advantages of this construction is the elimination of the delay due to the necessity of shutting down the work on each kettle at least one day each week for drossing. By eliminating this delay, an increase of approximately 15% is secured in the tonnage. Furthermore, it is obvious this device saves the labor which it ordinarily takes to dross out a pipe kettle, this labor averaging about $200 to $250 per month per kettle.

It will be noted that the scraper 19 is T-shaped in cross section and as a consequence has a relatively wide base so that it rides flat upon the bottom of the trough so that the web 20 is supported at all times in a vertical position so that there is no danger of the scraper tilting. Preferably the side edges of the flat base of the scraper are beveled so as to cut the dross off the bottom and carry it up into the space between the bottom and the web. The perforations in the web 20 permit the passage of the scraper through the galvanizing liquid without unduly disturbing the latter, and the scraper thus also acts as a screen which gives the spelter a chance to sift through while the scraper operates slowly through the kettle.

While I have illustrated a construction which I believe to be particularly effective in practice, I do not wish to be limited thereto as it is obvious that many changes might be made in the details of construction and arrangement of parts without departing from the spirit of the invention.

I claim:—

1. The combination with an elongated kettle, of means for cleaning the bottom of the kettle comprising a scraper resting upon the bottom, power operated means for shifting the scraper back and forth along the bottom, and guides extending along the walls of the kettle parallel to the bottom thereof and with which the upper edge of the scraper is adapted to engage whereby the scraper shall be held against the bottom.

2. The combination with an elongated kettle having its bottom extending horizontally for a certain distance and then upwardly inclined at its ends, of a scraper operating over said bottom and ends, motor operated means for shifting the scraper longitudinally in opposite directions, and guides for holding the scraper against the bottom, said guides comprising longitudinally extending guide strips attached to the walls of the kettle and extending parallel to the bottom and upwardly inclined at their ends, the strips being reinforced at the junction of the horizontal portion with the upwardly inclined portion.

3. The combination with an elongated kettle having a bottom extending horizontally for a distance and then upwardly inclined at its ends, of a scraper movable in opposite directions along the bottom along said inclined ends, longitudinally extending guides on each wall of the kettle against which the scraper bears and extending upward parallel to the inclined ends, the guides holding the scraper in contact with the bottom, and a motor operated endless element attached at its ends to the scraper whereby the scraper may be pulled back and forth, and means for guiding said endless element.

4. The combination with an elongated kettle having a bottom formed with a horizontal portion and upwardly and outwardly inclined ends, of guide strips disposed against the walls of the kettle and extending parallel to the bottom and the upwardly inclined ends, a scraper extending transversely across the bottom and having its ends disposed beneath said guide strips and held thereby against the bottom, said scraper being T-shaped in cross section to provide a flat portion riding on the bottom and a vertical portion, means attached to the ends of the scraper and extending in opposite directions, and motor operated operating cables operatively connected to said means whereby the scraper may be drawn back and forth over the bottom of the kettle and up the inclined ends and out of the kettle.

5. The combination with an elongated kettle having upwardly inclined ends, of a scraper adapted to rest upon the bottom of the kettle and be moved back and forth therein, said scraper being T-shaped in cross section to afford a flat member riding upon the bottom of the kettle and a vertically perforated member, cables operatively connected to opposite sides of the scraper whereby the scraper may be pulled back and forth over the bottom of the kettle, and means for holding the scraper against the bottom of the kettle.

6. The combination with a base having side walls, a trough-shaped kettle proper disposed within said base and having side walls spaced from the side walls of the base, the bottom of the kettle being horizontal and having upwardly inclined ends, and transverse yokes engaging the side walls of the base and depending into the trough, of guide strips mounted upon the sides of the trough and extending horizontally and upwardly inclined at their ends, a scraper resting upon the bottom of the trough and movable longitudinally thereof beneath said guide strips, and cables operatively connected to the scraper and extending out through the ends of the trough and operatively connected to motor operated means whereby the cables may be shifted to thereby shift the scraper.

7. Means for cleaning the bottoms of trough-shaped kettles comprising a scraper adapted to rest upon the bottom of the kettle and to move longitudinally therealong, power operated means adapted to shift the scraper back and forth along the bottom of the kettle, and guides adapted to be disposed along the walls of the kettle parallel to the bottom thereof and with which the upper edge of the scraper is adapted to engage to thereby hold the scraper against the bottom.

8. Means for cleaning the bottoms of elongated kettles having upwardly inclined ends comprising a scraper adapted to rest upon the bottom, power operated cables connected to the scraper and adapted to shift the scraper back and forth along the bottom of the kettle and up the inclined ends thereof, and guides adapted to be disposed parallel to the bottom of the kettle and parallel to the upwardly inclined ends thereof and with which the upper edge of the scraper is adapted to engage to thereby hold the scraper against the bottom.

In testimony whereof I hereunto affix my signature.

HARRY CLYDE EBRIGHT.